United States Patent [19]
Elmers et al.

[11] Patent Number: 5,850,304
[45] Date of Patent: Dec. 15, 1998

[54] OPTICALLY PROGRAMMABLE CONTROLLER

[75] Inventors: Miles Martin Elmers; Michael Andrew Wood, both of Scottsdale, Ariz.

[73] Assignee: Scottsdale Technologies, Inc., Scottsdale, Ariz.

[21] Appl. No.: 780,261

[22] Filed: Jan. 8, 1997

[51] Int. Cl.⁶ .................................................. H04B 10/00
[52] U.S. Cl. ................... 359/142; 340/825.57; 348/734; 359/146; 364/705.05
[58] Field of Search ................................... 359/142, 146, 359/148; 345/158, 2; 341/176; 348/734, 552; 364/705.05; 340/825.57, 825.63

[56] References Cited

U.S. PATENT DOCUMENTS

| | | | |
|---|---|---|---|
| 4,802,114 | 1/1989 | Sogame | 359/146 X |
| 4,866,434 | 9/1989 | Keenan | 340/825.57 X |
| 5,043,723 | 8/1991 | Araki et al. | 340/825.69 |
| 5,535,147 | 7/1996 | Jacobs et al. | 364/705.07 |
| 5,652,602 | 7/1997 | Fishman et al. | 345/2 X |

*Primary Examiner*—Thomas J. Mullen, Jr.
*Attorney, Agent, or Firm*—Cahill, Sutton & Thomas P.L.C.

[57] ABSTRACT

A programmable controller includes a photodetector for receiving data as pulses light from a video display and infra-red emitting diodes for transmitting pulses of light in a format recognized by the device to be controlled. The light from the video display is produced by generating a series of vertically displaced, horizontal lines on the screen of the display. Each line corresponds to a pulse of light and to one bit of information and one or more bytes are displayed per frame on the display. The display produces two initial lines that define a timing window for receiving the remaining data and produces a terminal line that toggles for error detection. The controller produces pulses in the format required by the controlled device by executing a sub-set of primitives from a set stored in the controller. The primitives are executed in a sequence determined by the data from the video display.

32 Claims, 4 Drawing Sheets

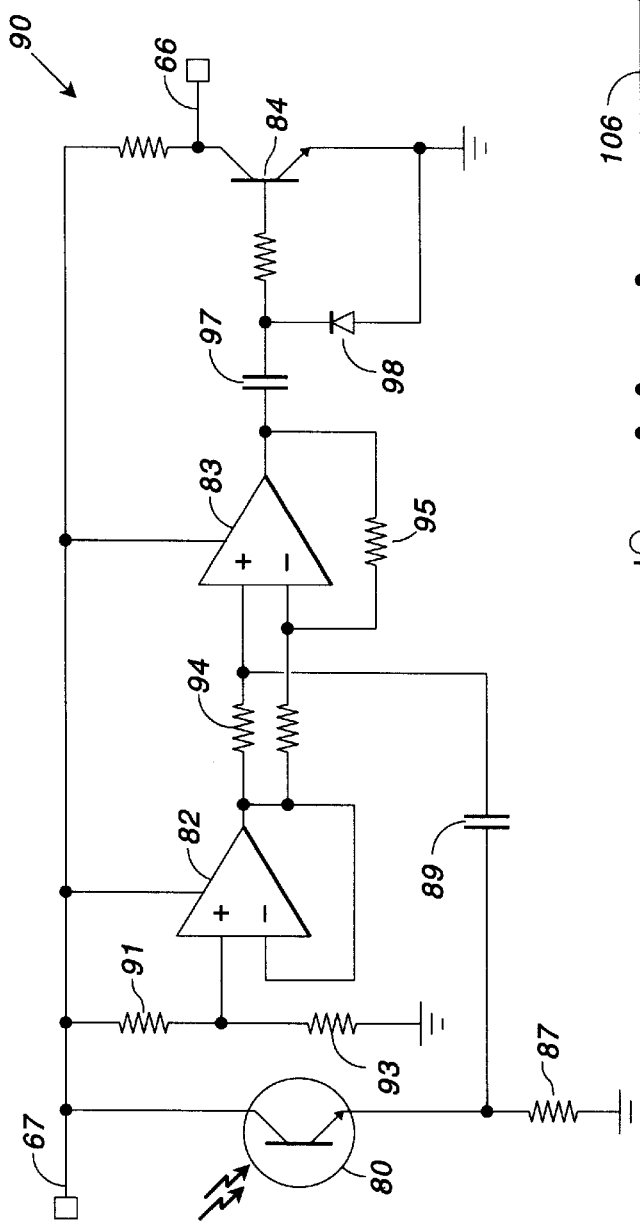
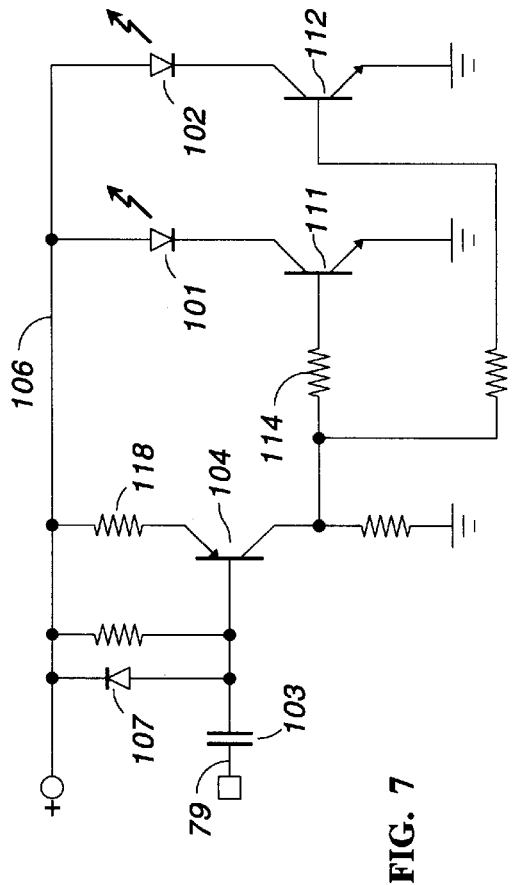
FIG. 6
FIG. 7

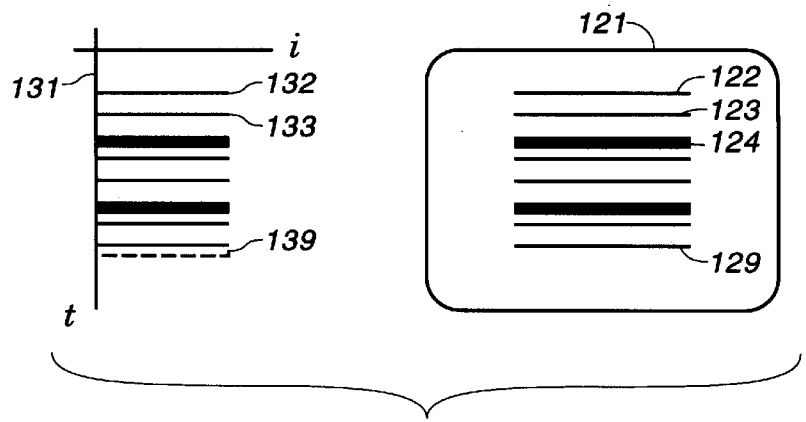
FIG. 9
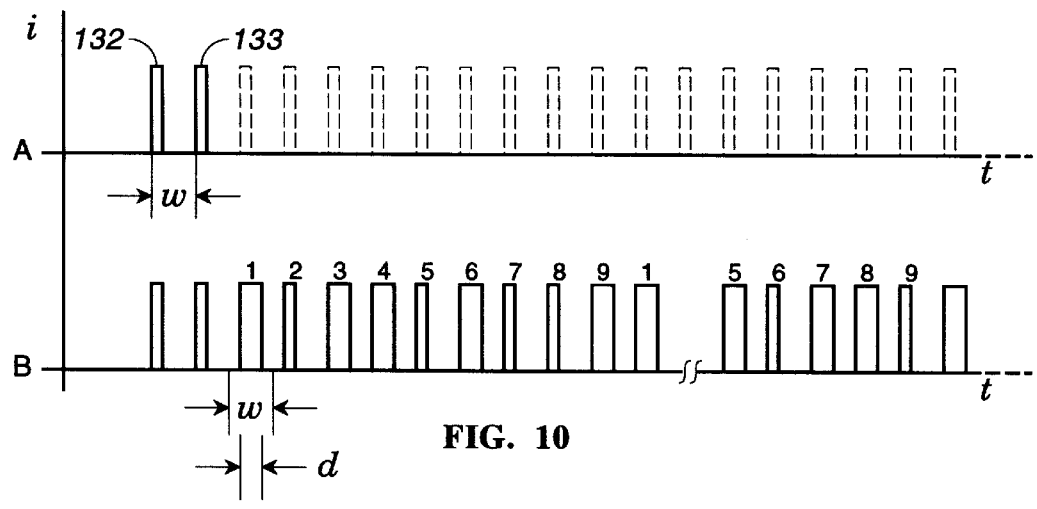
FIG. 10
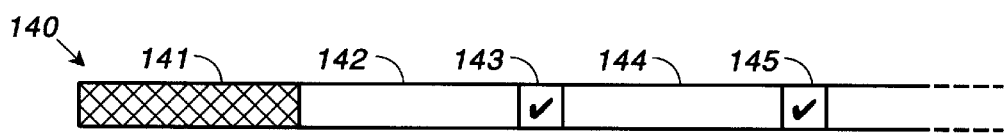
FIG. 11
1111—00101010—0000—11010101
         151                  152
FIG. 12
110000—1—0110100—00
              155
FIG. 13
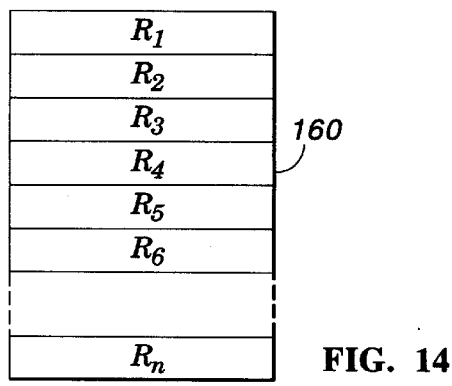
FIG. 14

OPTICALLY PROGRAMMABLE CONTROLLER

BACKGROUND OF THE INVENTION

This invention relates to an optically programmable controller and, in particular, to transmitting and receiving serial data over a self-calibrating optical link.

Almost from the time the VCR was first introduced, the successful operation of a VCR has been a litmus test of a person's ability to deal with modern technology and individual encounters with a VCR have long been a source of humor. This invention is described in the context of a programmable controller for a TV/VCR but the invention has much wider application.

It is known in the art to provide systems for automatically programming a TV or VCR in accordance with a published schedule of shows. U.S. Pat. No. 4,706,121 (Young) describes such a system in which broadcast schedules are received and stored in a computer that controls a programmable tuner, TV, and VCR. Typical of the prior art, the Young patent describes a system that requires special equipment and a direct connection to the internal circuitry of the controlled device. This approach is too expensive and too complicated. Further, the approach eliminates the installed base of TV owners as customers.

What is desired is a controller that anyone can use with their existing computer and TV/VCR. A first problem is how to program the controller with appropriate data. There are two kinds of information that any controller needs. The first kind is the desired schedule of operation, e.g. the date, time, and channel for each show. The second kind of information is the format expected by the infra-red receiver in the TV or VCR. A remote control transmits a series of infra-red pulses but manufacturers of consumer electronic products do not all use the same format for the pulses and a controller for one brand of product is unlikely to work with another brand of product. The problem is compounded by the fact that any given controller is obsolete without the latest formats. If one adds a component to a home entertainment system, it is desirable to have the programmable controller be able to operate the new component also.

Assuming that the necessary formatting information is available, the problem remains of how to program a controller. It is known in the art to use a video display, such as a television screen, as a pulse source for transferring data. In the late 1970's, some Commodore® computers included a "light pen" that was placed over a spot on the screen of a television and pulses of light were used to transfer data, slowly but steadily, into a computer from the television. Because the raster in a television is interlaced from two scans, a new picture is produced every 1/30 of a second, in countries having 60 hz power lines. Thus, the pulse rate for such a data link is limited to thirty pulses per second.

More recently, the transfer of data from a video display to an optical detector has been improved by defining a series of horizontal lines on a display. The number of bits transferred per frame is equal to the number of lines on the screen, typically six to eight. In theory, one could transmit 625 bits of data (the number of lines actually scanned) per frame but this would require expensive optics at the receiver. The goal is to provide a low cost, relatively simple device for transferring data. High resolution optics do not fit the cost constraint.

Resolution aside, there are at least two problems with using a video display as a source of data. One problem is the timing of the light pulses. The frames of a screen are locked to the frequency of a power line but the placement and spacing of the lines in a screen affects timing. For example, two luminous scan lines separated by thirty dark scan lines will produce pulses having different spacing from two luminous scan lines separated by twenty dark scan lines. The timing of the lines is also affected by the video board generating the lines and the video display on which the lines are drawn.

For example, a monochrome display for an older IBM computer has a horizontal sweep rate of 18.432 khz. A "CGA" display has a horizontal sweep rate of 15.75 khz, an "EGA" display has a horizontal sweep rate of 15.7–21.8 khz., and a "VGA" display has a horizontal sweep rate of 31.5 khz. All of these displays have a vertical sweep of 50–70 hz. Many other displays have been sold The timing of lines produced on such displays can have a wide range of timing and duration. One can provide a calibration mechanism for forcing these displays to produce lines having a predetermined timing but this is very difficult to do in practice. Inevitably, some combination of video board and display cannot be calibrated. Further, the ordinary user cannot or should not be expected to calibrate the display on a computer.

The timing of the light pulses must be known accurately to provide a reliable transfer of data in the presence of noise, such as ambient light. Fluorescent lighting, particularly from lamps driven at 60 hz by magnetic ballasts, are particularly difficult because of the 120 hz flicker produced by the lamps. Fluorescent lamps driven by electronic ballasts produce little, if any, flicker. Unfortunately, most homes and many older office buildings use magnetic ballasts for fluorescent lamps.

One could define a timing standard and hope that everyone would adhere to it but standards in the consumer electronics industry are not readily accepted. Even if a standard were adopted, the standard would not apply to the millions of computers in existence. It is preferable to have a system that is both "downward" compatible and "upward" compatible to prevent a manufacturer from making a competitor's product obsolete.

Timing is not the only problem with transmitting data from a video display. The computer driving the display typically has several active "interrupts." An interrupt is a hardware connection to the microprocessor in the computer that causes the microprocessor to execute a short software program, a "routine," in response to a change in state of the hardware, e.g. closing a switch. A typical example of an interrupt is a keyboard that causes an interrupt each time that a key is depressed. The interrupt service routine retrieves the keystroke, stores data corresponding to the key in memory or in a buffer, and then returns to where it left off in another routine at the time of interrupt.

If an interrupt occurs while the video display is being updated, then the data on the screen of the display is frozen until the interrupt is over. If a receiver is expecting new data every frame, the frozen data is accepted as several bytes of new data in which successive bytes are identical. One solution to this problem is to turn off all interrupts in a computer. Unfortunately, this cannot be done. Some interrupts are "non-maskable," i.e. they cannot be turned off. Non-maskable interrupts are used for tasks that cannot be postponed, e.g. refreshing dynamic RAM. Thus, interrupts must be accommodated in any system for transmitting data from a video display.

Once the data is ready to transmit to the controlled device, e.g. a VCR or TV, the problem is one of power. A hand held remote control, as typically provided with a TV or VCR, is turned on only when the user presses a button. Thus, battery life can be relatively long. Further, most users know to point the remote control more or less at the device being controlled. A programmable controller is turned on all the time as the controller awaits the proper time to actuate the controlled devices in accordance with a predetermined schedule. Thus, battery life is a problem because a user expects the batteries to last as long as in a hand held remote control. This perception is reinforced by the fact that a programmable controller may have fewer buttons than a hand held controller. Thus, a user perceives the programmable controller as a simpler device that should require even less power than a hand held controller having a large number of buttons.

Another problem with a programmable controller is the fact that it is left somewhere and forgotten but is expected to function correctly. Whether or not the programmable controller is pointing at the controlled device is a matter of chance. Thus, the intensity of the emission from the programmable controller must be relatively strong over a wide field. Such a signal requires power. Thus, a long battery life is at odds with other requirements of the system.

In view of the foregoing, it is therefore an object of the invention to provide a controller that can receive data reliably from a video display.

Another object of the invention is to provide a controller that calibrates itself from the received signal, thereby obviating timing errors.

A further object of the invention is to provide a programmable controller that can receive data reliably from a video display driven by a computer executing an interrupt service routine during data transmission.

Another object of the invention is to provide a programmable controller that is inexpensive and is compatible with pre-existing consumer electronic devices.

A further object of the invention is to provide a programmable controller that is inexpensive and is adaptable to communicate with future consumer electronic devices.

Another object of the invention is to store formatting data as efficiently as possible in a programmable controller.

A further object of the invention is to provide a programmable controller that has a battery life at least three quarters that of a hand held control operating on the same type of batteries.

Another object of the invention is to provide a programmable controller that consumes relatively little power but broadcasts a signal over a wide area.

A further object of the invention is to provide a programmable controller that receives data as optical pulses in a first format and transmits data as optical pulses in a second format, as required by the controlled device.

SUMMARY OF THE INVENTION

The foregoing objects are achieved in this invention in which a programmable controller includes a photodetector for receiving data as pulses light from a video display and infra-red emitting diodes for transmitting pulses of light in a format recognized by the device to be controlled. The light from the video display is produced by generating a series of vertically displaced, horizontal lines on the screen of the display. Each line corresponds to a pulse of light and to one bit of information and one or more bytes are displayed per frame on the display. A bright line represents a logic "1" and a dark line represents a logic "0", or vice-versa. The display produces two initial lines that define a timing window for receiving the remaining data and produces a terminal line that toggles for error detection.

Data downloaded from the video display is converted into pulses of the appropriate format by a microcontroller. In accordance with another aspect of the invention, the conversion takes place by operating on a set of primitives, previously stored in the microcontroller, in accordance with sequence data received from the display. The microcontroller interprets the sequence data to produce output pulses in the appropriate format for the controlled device. Any format, even those unknown at the time the programmable controller was purchased, can be constructed from the primitives.

The microcontroller includes I/O ports, RAM, timing circuitry, and a "sleep" (low power) mode of operation. In accordance with another aspect of the invention, one line from an output port is used as a voltage supply for external circuitry. Thus, when the microcontroller enters the sleep mode, the external circuitry is also turned off, further conserving energy. A "watch dog timer" awakens the microcontroller at the appropriate time to transmit data to the controlled device. After the data is transmitted, the microcontroller re-enters the sleep mode. Pressing a button on the programmable controller awakens the microcontroller for receiving data from a video display.

BRIEF DESCRIPTION OF THE DRAWINGS

A more complete understanding of the invention can be obtained by considering the following detailed description in conjunction with the accompanying drawings, in which:

FIG. 6 is a schematic of a circuit for receiving optical data;

FIG. 7 is a schematic of a circuit for transmitting optical data;

FIG. 9 illustrates the screen of a video display transmitting data in accordance with an alternative embodiment of the invention;

FIG. 10 is a timing diagram showing pulses transmitted in accordance with the alternative embodiment of the invention;

FIG. 11 illustrates the content of the data stream to a programmable controller constructed in accordance with the invention;

FIG. 12 illustrates the content of the data stream for operating a first electronic device;

FIG. 13 illustrates the content of the data stream for operating a second electronic device; and FIG. 14 is a memory map of primitives for producing output pulses in the format appropriate for a particular electronic device.

DETAILED DESCRIPTION OF THE INVENTION

Figure 1:
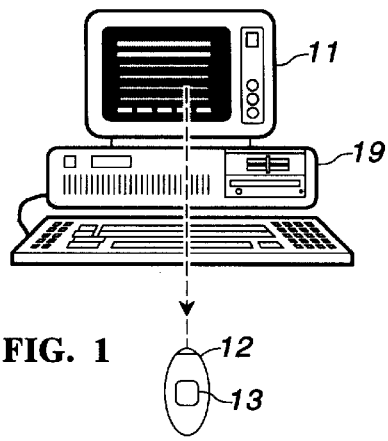
FIG. 1 illustrates data being downloaded from a video display to a programmable controller in accordance with the invention.
Figure 2:
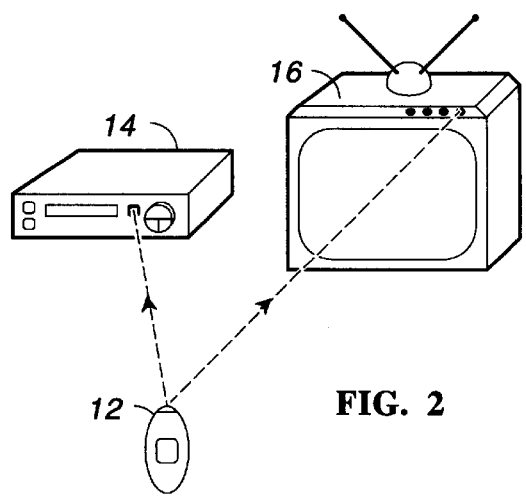
FIG. 2 illustrates data being downloaded from the programmable controller to a VCR and a TV in accordance with the invention.

FIGS. 1 and 2 illustrate the overall operation of a programmable controller constructed in accordance with the invention. In FIG. 1, data is transmitted from computer display 11 to programmable controller 12 as a series of light pulses. Controller 12 is actuated by depressing button 13, causing the controller to turn on and to activate receiving circuitry, described in connection with FIG. 6. A human being viewing display 11 sees the data as a plurality of horizontal lines on the display. A photodetector within controller 12 sees the lines as a series of pulses of light. Controller 12 converts the serial, optical data into a series of data bits and stores the bits in memory within the controller. In accordance with one aspect of the invention, controller 12 calibrates itself to the timing of the incoming data. Thus, controller 12 is capable of receiving data from the display of any computer.

In FIG. 2, controller 12 transmits command sequences at the appropriate times to operate VCR 14 or television 16. Controller 12 operates VCR 14 and television 16 in real time, thereby enabling the controller to be compatible with any consumer electronics device presently or previously on the market. The controller emits signals at the appropriate time for a series of operations, e.g. turn on the VCR, set the channel, begin recording, stop recording, rewind, turn on the TV, playback, turn off the TV and VCR.

Figure 3:
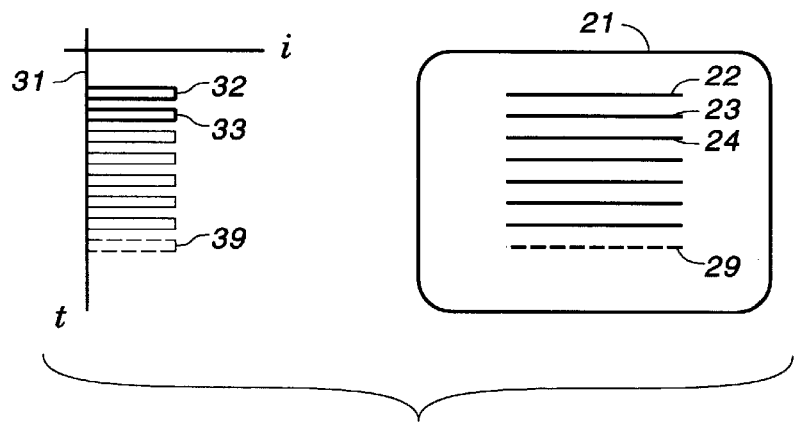
FIG. 3 illustrates the screen of a video display transmitting data in accordance with the invention.

FIG. 3 illustrates how data is transmitted in accordance with the invention. As known in the art, an image is produced on a video display by scanning an electron beam across the display to produce a plurality of vertically displaced, horizontal lines. In accordance with the invention, some of these lines are rendered luminous to produce a series of pulses that are detected by a photodetector in the programmable controller.

Display 21 includes lines 22, 23, 24, and 29. In accordance with a preferred embodiment of the invention, in order to produce more light, three adjacent horizontal traces are rendered luminous to produce each single line as represented in display 21 and as seen by the photodetector. In other words, if one were to look at display 21 under a magnifying glass, line 22 would actually include three traces. Merging adjacent traces to produce a single, more luminous line also enables one to use a less expensive photodetector, thereby reducing the cost of the programmable controller.

The horizontal lines in a display are vertically displaced with the scanning beginning at the top of the display. Graph 31 illustrates the intensity of the display versus time. In graph 31, pulse 32 corresponds to line 22, pulse 33 corresponds to line 23, and pulse 39 corresponds to line 29. Thus, as seen by a photodetector, display 21 produces a series of pulses that are converted into a plurality of bits of serial data.

FIG. 3 illustrates two aspects of the invention that are different from the prior art. One aspect is that the first two lines represent timing information for receiving the remaining data. That is, these lines are always present at the beginning of each frame. A second aspect of the invention is illustrated by dashed line 29. As seen by a human being, line 29 appears to flicker. Line 29 is preferably the last line in a frame and is toggled to assure correct interpretation of the data from display 21. "Toggling" means that the line alternates between bright and dark in consecutive frames. Whether light represents a logic "1" and dark represents a logic "0", or vice-versa, is a matter of choice.

Figure 4:
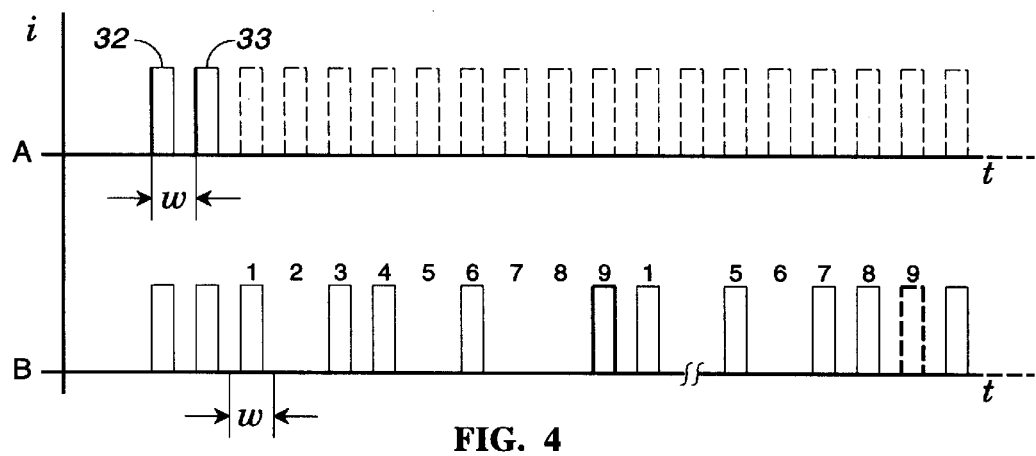
FIG. 4 is a timing diagram showing pulses transmitted in accordance with the invention.

FIG. 4 illustrates the format of the data from the video display in greater detail. In particular, as represented by waveform A, the lines produced by a video display have a period that is determined by the size of the display, the spacing of the lines, and the nature of the video board driving the display. The spacing of the lines is also determined by the program controlling the display, which determines the number of blank traces between each set of luminous traces.

In accordance with the invention, a programmable controller reads the first two lines of the display and determines the period, w, between the beginning of the first line and the beginning of the second line. Each horizontal trace lasts approximately forty microseconds ($\mu s$). If three traces are used to produce a single luminous line, then the duration of each pulse is approximately one hundred twenty $\mu s$. If one separates the lines by ten traces, then w=(120+(10×40)) $\mu s$ or approximately 520 $\mu s$. The period from the beginning of one pulse to the beginning of the next pulse is then used to define a window through which the controller looks for subsequent data, as illustrated in waveform B.

Appendix A lists the routines for determining pulse period w. The references to "0.5 cell time" and "1.5 cell time" relate to moving the window over to straddle the light pulses. This is illustrated by waveform B in FIG. 4, wherein period w is centered under data bit 1 (and each subsequent bit). Window w is applied to the pulses and, in the series illustrated in waveform B, bits 1, 3, 4 and 6 of the first byte are logic 1's and bits 2, 5, 7 and 8 are logic 0's. Appendix B is the listing for reading data from the photodetector.

As described further herein, if the programmable controller detects an error in the data, the user is signaled, and downloading must be repeated in order to correctly receive the data. By virtue of the definition of a timing window, programmable controller 12 adapts itself to any computer and video display. By virtue of the toggle bit, programmable controller 12 is immune to errors caused by interrupts.

Bit 9 of each byte is the toggle bit and enables a modest amount of error detection. If an interrupt occurs while data is being sent to the screen, the toggle bit remains unchanged. A programmable controller looking at the data sees that some of the data has changed but that the toggle bit has not changed. The controller ignores that byte of data and receives the next byte. If the interrupt is still being serviced, the toggle bit remains unchanged and the next byte is discarded. When the interrupt is over, the remainder of the data is changed, including the toggle bit. The controller receives the data, recognizes that the toggle bit has been switched, and accepts the byte as valid data. The timing and duration of interrupts are of no effect because the toggle bit is the last part of the data to be changed.

In operation, a person operating computer 19 (FIG. 1) indicates choices on a schedule (not shown) from which the person has selected the shows to be viewed or recorded. The schedule can be obtained from a variety of sources, e.g. on-line subscriptions, a disk received by mail. Data defining the selected shows is transmitted to controller 12 from display 11 as a plurality of pulses of light. The user also identifies the device to be controlled and format data for this device is also transmitted to controller 12. Internally, computer 19 looks up the controlled device in a table and transmits the necessary format for communicating with the particular brand and model of TV or VCR. Once the transfer of data is completed, controller 12 is placed at a location where it can optically communicate with VCR 14 and TV 16. At the appropriate time, controller 12 turns on a device using the correct data format for that device. Thus, the programmable controller can be used with any TV, VCR, or other device.

Figure 5:
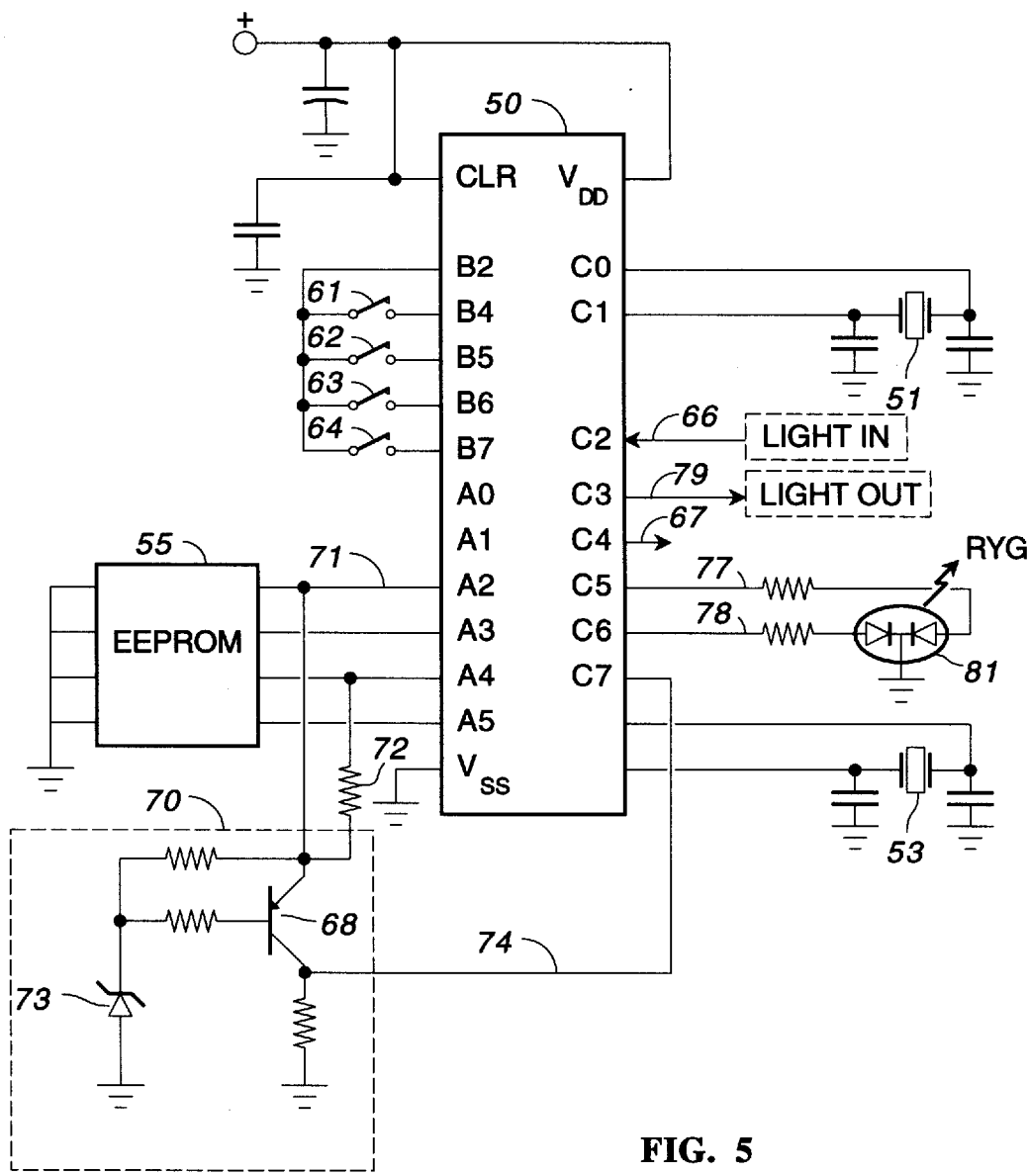
FIG. 5 is a schematic of a microcontroller and peripheral circuitry for implementing the invention.

FIG. 5 illustrates a microcontroller for implementing the invention. In one embodiment of the invention, microcontroller 50 was a PIC16C62A microcontroller as sold by Microchip Technology, Inc. This microcontroller includes ROM, RAM, I/O ports, and several timing circuits including a watch dog timer. This microcontroller also has a minimal instruction set, enabling it to execute the necessary tasks in real time even at low clock frequency.

Crystal 51 provides a first clock frequency of 32,768 ($2^{15}$) hertz for time-keeping applications. Crystal 53 provides the local clock for operating microcontroller 50 and has a frequency of 4 megahertz. EEPROM 55 provides additional data storage for infrequently changed data, such as formatting data. Switches 61, 62, 63, and 64 are connected to separate inputs of port B. Of these, only switch 61 is necessary for operating microcontroller 50 in accordance with the invention. Switch 61, when closed, causes an interrupt that sends microcontroller 50 into a light link routine wherein the microprocessor looks for data on input line 66 from a video display. Switch 64 causes an interrupt that sends microcontroller 50 into a routine that demonstrates the operation of the controller. Switches 62 and 63 can be used to trigger interrupts for additional functions.

In accordance with another aspect of the invention, output lines from the I/O ports are used to power peripheral circuitry. When microcontroller 50 enters a sleep mode, voltage is removed from these output lines and the external circuitry is turned off also. Output line 67 powers light detection circuitry (FIG. 6). Output line 71 powers EEPROM 55.

Low voltage detector 70 monitors battery voltage by looking at the voltage on output line 71. As long as zener diode 73 is conducting, transistor 68 conducts and the voltage on line 74 remains high. If the voltage on line 71 drops below a predetermined threshold, e.g. 2.5 volts, then zener diode 73 stops conducting, transistor 68 stops conducting, and the voltage on line 74 drops to ground potential. A low on line 74 causes an interrupt that disables other interrupts and prevents microcontroller 50 from producing the normal output signals for the user.

Microcontroller 50 communicates with a user through dual LED 81, controlled by outputs 77 and 78. Dual LED 81 includes a red LED and a green LED. When both LEDs are turned on, dual LED 81 glows yellow. When a low voltage condition causes an interrupt, microcontroller 50 pulses the green diode each time that a user closes switch 61. This is recognized as an indication of low voltage. During normal operation, actuating switch 61 turns on the red LED while controller 50 hunts for the beginning of the data stream, indicated by pulses 32 and 33 (FIGS. 3 and 4). During downloading, both LEDs are turned on, providing a yellow indication. When downloading is successfully completed, the green LED is turned on. The number, color, and sequence of the LEDs can be varied to suit a particular application.

FIG. 6 illustrates light detecting and pulse shaping circuitry constructed in accordance with the invention. Line 67 provides power for photodetector 80, amplifier 82, amplifier 83, and transistor 84. Photodetector 80 is connected in series with resistor 87 between line 67 and ground, acting as a variable voltage divider. Light incident upon photodetector 81 changes the resistance thereof, thereby changing the voltage at the junction of photodetector 81 and resister 87. This variable voltage is coupled through capacitor 89 as one input to amplifier 83. Operational amplifier 82 acts as a reference voltage source having an output voltage proportional to the voltage at the junction of resistors 91 and 93. Amplifier 82 could be eliminated and another source of reference voltage used instead. Amplifier 82 and amplifier 83 are a single semiconductor device and, to reduce component count, amplifier 82 was used as a source of reference voltage.

Amplifier 83 compares the signal from photodetector 81 with the reference voltage and produces an output voltage proportional to the difference between the voltages. Feedback resistor 95 reduces the magnitude of the voltage swing and stabilizes the circuit. The output signal from amplifier 83 is coupled through capacitor 97 to transistor 84. Diode 98 prevents the base of transistor 84 from going negative relative to ground. Resistor 94 and capacitor 89 provide a small amount of filtering that helps pulse detecting circuit 90 to ignore 120 hz. flicker from a fluorescent lamp. Transistor 84 provides a level shift to assure that correct voltages are applied to input pin 66, corresponding to a logic high or a logic low signal.

Circuit 90 is powered from one pin of the microcontroller in order to reduce power when not in use. Specifically, the microcontroller includes a watchdog timer that enables the microcontroller to awaken periodically for transmitting signals in a timely fashion to the controlled electronic devices. Similarly, any time that the microcontroller is awakened by the user for downloading information, power is applied to line 67, enabling circuit 90 to receive pulse information. The variations in light intensity are converted by amplifier 83 into a series of pulses that are coupled by way of transistor 84 to an input pin of the microcontroller. The microcontroller stores the information in memory and converts that information into a command sequence for controlling a device by using look-up tables containing the necessary information. The data for such tables is commercially available and is licensed for use.

The command sequence is output on pin 79 (FIG. 5) as a series of pulses in the proper format for controlling a TV, VCR, or other device. The circuitry illustrated in FIG. 7 couples the pulses from line 79 to infra-red emitting diodes 101 and 102. The circuit of FIG. 7 is designed to turn off completely when there is no signal from microcontroller 50, thereby conserving power yet providing enough current to drive diodes 101 and 102 to a useful luminosity.

In FIG. 7, the input signal for the diodes is coupled through capacitor 103 to transistor 104. Diode 107 prevents the signal to transistor 104 from going positive relative to the supply voltage on rail 106. Transistor 104 acts as an emitter follower providing current to transistors 111 and 112. Isolation resistors 114 and 115 prevent either of transistors 111 or 112 from hogging the available current. In accordance with one aspect of the invention, transistor 111 is connected in series with diode 101 between supply rail 106 and ground; i.e. there is no load resistor. Similarly, transistor 112 is connected in series with diode 102 between rail 106 and ground. This enables diodes 101 and 102 to emit a fairly strong signal even with low battery voltage. Transistors 111 and 112 are not normally fully conductive when on but operate as variable resistors. The current through diodes 101 and 102 is regulated by resistor 118 in series with transistor 104.

With a low voltage, or no voltage, on output 79, transistor 104 is biased off, thereby turning off transistors 111 and 112. Thus, even though the circuit is powered directly from the supply rail (connected to a battery, not shown), the circuit dissipates no power when there is no transmission. Thus, battery life is further extended.

Figure 8:
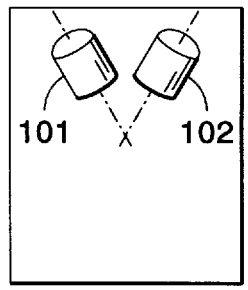
FIG. 8 illustrates the orientation of infra-red LED's in accordance with the invention.

In a preferred embodiment of the invention light emitting diodes 101 and 102 are mounted within the controller such that the optical axes of the diodes intersect within the controller, as illustrated in FIG. 8. Diode 101 faces slightly left of center from the controller and diode 102 faces slightly right of center from the controller. This configuration increases the beam spread available and can be adjusted to cover an angle of approximately 150°. This assures that the controller can actuate devices at widely separate locations within a room. The positioning of diodes 101 and 102 also assures that the controller will function correctly even if the user does not point the controller directly at the controlled device.

FIG. 9 illustrates how data is transmitted in accordance with an alternative embodiment of the invention. Display 121 differs from display 21 in that data in display 21 is indicated by the presence or absence of a line, whereas data in display 121 is indicated by the width of a line. Presence or absence of a line is easier to detect than line width but a variable line width has slightly better noise immunity because there is always a line at a certain time.

Display 121 includes lines 122, 123, 124, and 129. As with FIG. 3, adjacent horizontal traces are rendered luminous to produce each single line. Unlike FIG. 3, several traces are merged to form wide line representing a logic one and three traces are merged to form a narrow line or logic zero, or vice-versa. The horizontal lines are vertically displaced and graph 131 illustrates the intensity of the display versus time. In graph 131, pulse 132 corresponds to line 122, pulse 133 corresponds to line 123, and pulse 139 corresponds to line 129. Thus, as seen by a photodetector, display 121 produces a series of variable width pulses that are converted into a plurality of bits of serial data.

FIG. 10 illustrates two techniques for detecting the pulses from display 121. In waveform A, timing window w is defined as described in conjunction with FIG. 4. In waveform B, window w is used to define the boundaries within which a pulse must occur and the pulse width is measured. This first technique, in effect, measures time from pulses 132 and 133. By the bottom of a video frame, distortion could cause some timing problems. In a second technique, pulses 132 and 133 provide timing data but this data is used to look for the beginning of each pulse from the previous pulse. Once a pulse is detected, the start time is noted, pulse width d is measured, and the pulse is converted into a logic one or a logic zero depending upon width d. The next pulse is looked for by measuring from the beginning of the previous pulse, thereby minimizing cumulative error. Either technique is suitable for use in the invention.

FIG. 11 illustrates the content of the data from a video display. Data stream 140 includes header 141, data bytes 142, check bytes 143, data bytes 144, check bytes 145, and so forth. In one embodiment of the invention, header 141 is of variable length and the data is sent in groups of thirty bytes, followed by two check bytes. Other formats could be used but periodic check bytes are preferred. The entire message has a length determined by the number of operations to be performed by the controlled devices. In one embodiment of the invention, header 141 includes, as the first two bytes, the length of the header in bytes followed by housekeeping data including an offset to protocol data; how many shows, if any; how many TVs; how many VCRs; how many cable boxes; the current system time; and room set-up information (e.g. which device changes channels). The content of the housekeeping data changes with the particulars of the operations to be performed.

The command data following the header is converted into command sequences of the correct format for the controlled device. FIG. 12 illustrates the sequence for the "power" command for a television sold by General Electric Company. This command turns the television on if it is off and off if it is on. The sequence is twenty four bits long and the second half of the sequence is the logical inverse of the first half. More specifically, key command 151 is inverted and sent in the second half of the sequence as inverted key command 152. The hyphens are visual aids, not part of the data.

FIG. 13 illustrates the command sequence for the "power" command for a television sold by JVC. Key command 155 is preceded by a prefix of seven bits and is followed by a pair of zeros, for a total of sixteen bits. As can be seen from FIGS. 12 and 13, the command sequences used by different manufacturers are very different. Also different is the frequency of the pulses, the particular format of ones and zeros, e.g. NRZ, and other aspects of the transmission. Tracking the industry and remaining current is a formidable problem. Storing format data in a remote control guarantees that the control is out of date shortly after manufacture. The subsequent purchase of a VCR, for example, using yet another format would make a programmable controller obsolete.

In accordance with another aspect of the invention, data is stored as a set of primitives in the programmable controller. The primitives represents individual or small groups of operations that go into defining a format, e.g. selecting the frequency of the pulses. The data from the video display is a series of bytes referring to a sub-set of the primitives and the order in which they are to be executed. In effect, the data from the video display includes a symbolic description of the format. Thus, a programmable controller constructed in accordance with the invention converts data into the proper format by operating as an interpreter.

FIG. 14 illustrates memory map 160 storing a plurality of primitives $R_1$ through $R_n$. Each primitive is a short program or routine for doing a specific task. As an example, one embodiment of the invention included the following primitives: generating an AGC burst (an initial burst to wake up the controlled device and let it know that data is on the way); setting the pulse frequency; sending four bits of data value; sending five bits of data value; sending in NRZ (non-return to zero) format; addresses; delay for n milliseconds, where n is supplied by the video display; key value; key value complement; and others. As the primitives are executed in the sequence dictated by the command data from the display, the command sequences for the controlled device are produced.

In the prior art, a controller permanently stores and executes whole functions rather than primitives; i.e. a "function" is a string of primitives that produce the pulses characteristic of "Sony" or "RCA" brand controllers. This makes it very difficult or impossible to adapt a controller of the prior art to new devices. In accordance with the invention, the program tying the primitives together is transmitted to the controller. By placing device-specific format data in computer 19 (FIG. 1) and using primitives, a programmable controller constructed in accordance with the invention cannot go out of date. One could contrive a format requiring a component never used before and, therefore, for which there is no primitive but this is very much less likely than encountering a new format each model year. Current formatting data for all devices can be posted on a computer bulletin board, downloaded from a web site, or mailed to a subscriber as part of a programming service.

The invention thus provides a relatively simple device capable of accurately receiving data from a video display and capable of transmitting command sequences to any controllable electronic device. The controller can receive data reliably even if the computer driving a display executes interrupts during data transfer. The programmable controller consumes relatively little power, has good battery life, and transmits a strong signal over a wide area. The controller is unlikely to become obsolete by the subsequent introduction of new controllable devices and stores formatting data efficiently as a set of primitives from which a sub-set is selected to produce output pulses in the format required by a controlled device.

Having thus described the invention, it will be apparent to those of skill in the art that various modifications can be made within the scope of the invention. For example, the number of bits per frame is limited only by the number of scan lines and the optics of the photodetector. The photodetector can be a transistor, as shown in FIG. 6, a diode, or an array such as a CCD device, depending upon application and cost considerations. The number of synchronization bits can be increased if desired. Improved pulse shaping circuitry can be added to the circuit illustrated in FIG. 6 but would have to be powered from a different source than an output port of the microcontroller. In general, the programmable controller can be embellished with a variety of features but the trade-off is cost and power consumption. Although it is preferable that the lines are the only image on the display during transmission, one can display additional information during transmission by superimposing the lines on a less bright image. One can also use color shift to superimpose images during transmission from the display, depending upon the spectral sensitivity of the photodetector. Although the preferred embodiment of the invention relies on linear timing, one could compensate for distortion, e.g. barrel distortion or pincushion distortion, by producing the lines more closely in the middle of the display than near either the upper edge or the lower edge. If a controlled device is programmable, then the controller can program the device in a single transmission and need not operate in real time. For some applications, one can store many functions as a set of primitives for execution in response to data from a video display. For example, except for a boot loader, all programming in the controller can be executed as a string of previously stored primitives. Depending upon available storage (RAM, ROM, EEPROM, etc.), one can download additional primitives from a video display for executing command data following the transmitted primitives.

APPENDIX A

```
;************************************************************************
;
CCP1_EVENT
      BCF         PIR1, CCP1IF           ;Capture 1 Interrupt Flag
;
      btfss       MoreControlFlags,  FLAG_LL_END_CHAR     ;test if waiting for char to start
      goto        CP1_CHR                ;else building char
;
;Verify enough time since last bit for this to be a start bit (don't start in middle of char)
;
      movlw       h'13'                  ;test for enough time elapsed since last bit in for this to be a valid
start bit
      subwf       CCPR1H, w
      btfss       STATUS, C
      goto        END_INTR               ;not enough time to be a valid start bit, blow off this noise! (in
middle of char?)
;
;Enough time elapsed since last bit, this is the first start bit!
;
CP1_SB1
      bcf         T1CON, TMR1ON          ;turn off timer 1, prepare to measure interval of time until next bit
      movlw       LL_CORRECTION1         ;correction time factor for LL interrupt overhead
      movwf       TMR1L                  ;reset timbase
      clrf        TMR1H
      bsf         T1CON, TMR1ON          ;start timing interval until next bit in
;
      clrf        LLTimeBitL             ;put cell time here when found
      clrf        LLTimeBitH
      bcf         MoreControlFlags,  FLAG_LL_END_CHAR     ;char is starting
      clrf        IRDataReg              ;initialize buffer for receiving IR data
      bcf         MoreControlFlags,  FLAG_LL_TOGGLE_NOW   ;init to no toggle bit present
      movlw       h'80'
      movwf       LLDataMask             ;get data MSB first
;
      BCF         PIR1, CCP1IF           ;Capture 1 Interrupt Flag
      GOTO        END_INTR
;
;
;Char has started, test if in speed measurement mode
;
CP1_CHR
      movfw       LLTimeBitL             ;test if cell time is known
      bnz         CP1_DATA               ;if yes, we are recieving data - this is a data bit
      movfw       LLTimeBitH             ;test if cell time is known (maybe only low byte is 0)
      bnz         CP1_DATA               ;if yes, we are recieving data - this is a data bit
;
;Cell time is not known, this is the second start bit! - - - captured time is the bit cell time
;
CP1_SB2
```

APPENDIX A-continued

```
        if LL_AUTO_MODE
            movfw       CCPR1L                  ;save captured bit cell time
            movwf       LLTimeBitL
            movfw       CCPR1H
            movwf       LLTimeBitH
        else
            movlw       LL_CELL_TIME_L          ;STATIC CELL TIMING
            movwf       LLTimeBitL
            movlw       LL_CELL_TIME_H
            movwf       LLTimeBitH
        endif
;
;Calc 1.5 x cell time for end of 1st bit
;
            bcf         STATUS, C
            rrf         LLTimeBitH, w
            movwf       LLTimeS2EndH
            rrf         LLTimeBitL, w
            movwf       LLTimeS2EndL            ;S2 end now = 0.5 cell time
;
;
            movfw       LLTimeS2EndL            ;add 0.5 cell time to cell time
            addwf       LLTimeBitL, w
            movwf       LLTimeS1EndL
            btfsc       STATUS, C
            incf        LLTimeS2EndH
            movfw       LLTimeS2EndH
            addwf       LLTimeBitH, w
            movwf       LLTimeS1EndH            ;S1 end now = 1.5 cell time
;
;
            bcf         T1CON, TMR1ON           ;stop, reset, and restart timer 1 for end of bit 1 (toggle bit)
            movlw       LL_CORRECTION2          ;sub correction factor for 1st cell time
            movwf       TMR1L                   ;reset time for 1st data bit
            clrf        TMR1H
            movfw       LLTimeS1EndL            ;set time to current time - cell time (more accurate)
            subwf       TMR1L
            btfss       STATUS, C
            decf        TMR1H
            movfw       LLTimeS1EndH
            subwf       TMR1H
            bsf         T1CON, TMR1ON           ;T1 will now overflow at the end of bit cell 1
;
;
            BCF         PIR1, TMR1IF            ;Clear Timer 1 Interrupt Flag
            BCF         PIR1, CCP1IF            ;Capture 1 Interrupt Flag
            GOTO        END_INTR
;
CP1_DATA
CP1BitIn
            movfw       LLDataMask              ;test if mask is defined to merge bit in to recieved data
            bz          CP1BitInToggle          ;if not, bit is the toggle bit
CP1BitInData                                    ;bit in is a data bit
            iorwf       IRDataReg               ;merge bit in to recieved data reg
            GOTO        END_INTR
CP1BitInToggle                                  ;bit in is the toggle bit
btfss       MoreControlFlags,   FLAG_LL_END_CHAR    ;don't change toggle after end of chr
bsf         MoreControlFlags,   FLAG_LL_TOGGLE_NOW  ;toggle bit is present
GOTO                            END_INTR
```

APPENDIX B

```
;**********************************************************************************************
;**********************************************************************************************
;
;   Light Link Interface - Wait for Char In
;
;**********************************************************************************************
;**********************************************************************************************
;
    if (PRELOAD==FALSE)
;
WRreset
        call        INTS_OFF            ;Disable all Interrupts
        bsf         MoreControlFlags,   FLAG_LL_END_CHAR    ;set for timeout mode
        movlw       h'8'                ;x * 64ms (8=512ms, 20=2s, etc)
```

APPENDIX B-continued

```
        movwf      LLTimeout1
        clrf       IRDataReg                ;initialize buffer for receiving IR data
        clrf       LLTimeBitL               ;put cell time here when found
        clrf       LLTimeBitH
        bsf        INTCON, GIE              ;Enable all Interrupts
;
KeepWaiting
        movfw      LLTimeout1               ;test for timeout
        btfsc      STATUS,Z
        goto       CommEnd                  ;timeout waiting for start bit
;
  if 1
        btfss      MoreControlFlags,   FLAG_LL_END_CHAR       ;test for start of char
        goto       KeepWaiting2             ;if start, go to wait for end
        goto       KeepWaiting
;
KeepWaiting2
        movfw      LLTimeout1               ;test for timeout
        btfsc      STATUS, Z
        goto       CommEnd                  ;timeout waiting for end of char in
        btfsc      MoreControlFlags,   FLAG_LL_END_CHAR       ;test for end of char
        goto       RcvrDone                 ;if end, go process char in
        call       Wait5us
        goto       KeepWaiting2
  else
        bsf        INTCON, GIE              ;Enable all Interrupts
        btfsc      PORT_SERIAL_DATA_IN, BIT_SERIAL_DATA_IN    ;look for bit start
        goto       KeepWaiting
        nop
        nop
        btfsc      PORT_SERIAL_DATA_IN, BIT_SERIAL_DATA_IN    ;debounce
        goto       KeepWaiting
;
;********************************************************************************
;
LLStartBitIn
        call       INTS_OFF                 ;Disable all Interrupts
        bcf        T1CON, TMR1ON            ;stop, reset, and restart timer 1 for start bit measurement
        clrf       TMR1L
        clrf       TMR1H
        bsf        T1CON, TMR1ON
        bcf        MoreControlFlags,   FLAG_LL_END_CHAR       ;reset char end time indicator
        bsf        INTCON, GIE              ;Enable all Interrupts
        call       LLWaitBitEnd             ;wait for start bit 1 to end
        call       LLWaitBitStart           ;wait for start bit 2 to begin
        bcf        T1CON, TMR1ON            ;save time of start bit 2 leading edge
        movfw      TMR1L
        movwf      LLTimeS2StartL
        movfw      TMR1H
        movwf      LLTimeS2StartH           ;S2 start now = LL cell time - aliased as   LLTimeBitL and H
        movlw      LL_CORRECTION1           ;sub correction factor from cell time for LL interrupt overhead
        subwf      LLTimeS2StartL
        btfss      STATUS, C
        decf       LLTimeS2StartH           ;S2 start now = corrected LL cell time
;
;
        call       LLWaitBitEnd             ;wait for start bit 2 to end
;
; Calc 1.5 x cell time for 1st bit
;
        movfw      LLTimeBitL
        movwf      LLTimeS2EndL
        movfw      LLTimeBitH
        movwf      LLTimeS2EndH
;
        bcf        STATUS, C
        rrf        LLTimeS2EndH             ;S2 end now = 0.5 cell time
        rrf        LLTimeS2EndL
;
        movfw      LLTimeBitL
        movwf      LLTimeS1EndL
        movfw      LLTimeBitH
        movwf      LLTimeS1EndH             ;S1 end now = cell time
;
        movfw      LLTimeS2EndL             ;add 0.5 cell time to cell time
        addwf      LLTimeS1EndL
        btfsc      STATUS, C
        incf       LLTimeS1EndH
        movfw      LLTimeS2EndH
```

APPENDIX B-continued

```
        addwf      LLTimeS1EndH        ;S1 end now = 1.5 cell time
;
        movfw      LL_CORRECTION2      ;sub correction factor for 1st cell time
        subwf      LLTimeS1EndL
        btfss      STATUS, C
        decf       LLTimeS1EndH        ;S1 end now = 1.5 cell time - correction factor
;
;
        bcf        T1CON, TMR1ON       ;stop, reset, and restart timer 1 for end of bit 1
        clrf       TMR1L
        clrf       TMR1H
        decf       TMR1H
        movfw      LLTimeS1EndL
        subwf      TMR1L
        movfw      LLTimeS1EndH
        subwf      TMR1H
        bsf        T1CON, TMR1ON
;
;****************************************************************************
;
;       ;continue to recieve data byte
Rcvr
        bsf        INTCON, GIE         ;Enable all Interrupts
        call       LLWaitBitStart      ;wait for a bit to come in
        call       LLWaitBitEnd
;
        call       INTS_OFF            ;Disable all Interrupts
LLTestEnd
        btfsc      MoreControlFlags,   FLAG_LL_END_CHAR        ;test if end time of all bits in char
        goto       RcvrDone            ;end time of all bits in char
;
LLBitIn
        movfw      LLDataMask          ;test if mask is defined to merge bit in to recieved data
        bz         LLBitInToggle       ;if not get toggle bit
LLBitInData                            ;bit in is a data bit
        iorwf      IRDataReg           ;merge bit in to recieved data reg
        goto       Rcvr                ;keep looking for more bits
LLBitInToggle                          ;bit in is the toggle bit
        btfss      MoreControlFlags,   FLAG_LL_END_CHAR        ;don't change toggle after end of chr
        bsf        MoreControlFlags,   FLAG_LL_TOGGLE_NOW      ;toggle bit is present
        goto       Rcvr
    endif
;
;
RcvrDone
ToggleTest
        btfsc      MoreControlFlags,   FLAG_LL_TOGGLE_LAST
        goto       TT1
TT0
        btfss      MoreControlFlags,   FLAG_LL_TOGGLE_NOW
        goto       WRreset             ;error, same toggle bit --- chr repeated in video, skip
        goto       VCDataOut           ;else diff toggle means new data
TT1
        btfsc      MoreControlFlags,   FLAG_LL_TOGGLE_NOW
        goto       WRreset             ;error, same toggle bit --- chr repeated in video, skip
;
VCDataOut
        bcf        MoreControlFlags,   FLAG_LL_TOGGLE_LAST     ;copy current toggle bit for next test
        btfsc      MoreControlFlags,   FLAG_LL_TOGGLE_NOW
        bsf        MoreControlFlags,   FLAG_LL_TOGGLE_LAST
        bcf        STATUS, C
        retlw      0                   ;return with good data
;
CommEnd
        bsf        STATUS, C
        RETLW      0                   ;return with timeout indicator
;
;****************************************************************************
;****************************************************************************
```

What is claimed as the invention is:

1. An optically programmable controller comprising:

first means for receiving data transmitted in a first format as pulses of light; and second means, coupled to said first means, for transmitting data in a second format as pulses of light.

2. The optically programmable controller as set forth in claim 1 wherein said first means is sensitive primarily to visible light.

3. The optically programmable controller as set forth in claim 1 wherein said second means emits predominantly infra-red radiation.

4. The optically programmable controller as set forth in claim 1 and further including timing means for causing said second means to transmit data a predetermined time after the reception of data by said first means.

5. The optically programmable controller as set forth in claim 1 and further including timing means for causing said second means to transmit data at predetermined times after the reception of data by said first means.

6. The optically programmable controller as set forth in claim 1 and further including:

a battery for supplying power for said controller; and means for detecting a low voltage condition in said battery and for providing an indication of the low voltage condition.

7. The optically programmable controller as set forth in claim 1 and further including means for indicating the reception of data by said first means.

8. The optically programmable controller as set forth in claim 1 and further including means for indicating the transmission of data by said second means.

9. The optically programmable controller as set forth in claim 1 and further including means for indicating an error in the reception of data by said first means.

10. The optically programmable controller as set forth in claim 1 and further including:

a battery for supplying power to said programmable controller; and a microcontroller coupled to said battery and to said first means, said microcontroller having a sleep mode;

wherein said first means is powered by said microcontroller when the microcontroller is not in said sleep mode, thereby reducing power drain on said battery.

11. The optically programmable controller as set forth in claim 1 and further including:

a battery for supplying power to said programmable controller;

a microcontroller coupled to said second means and to said battery;

wherein said second means includes a plurality of transistors that are non-conducting absent a signal from said microcontroller, thereby reducing power drain on said battery.

12. The optically programmable controller as set forth in claim 1 and further including a programmed microcontroller interconnecting said first means and said second means, wherein the microcontroller derives the data transmitted by said second means from the data received by said first means.

13. The optically programmable controller as set forth in claim 12 and further including a memory for storing a set of primitives, wherein said microcontroller derives the data for transmission by said second means by executing a sub-set of said primitives in a sequence determined by the data received by said first means.

14. A method for operating a remotely controlled device responsive to infra-red signals transmitted in a particular format, said method comprising the steps of:

transmitting command data to a programmable controller as a plurality of pulses of light from the video display by producing a series of vertically displaced, horizontal lines on the video display;

converting the command data into a command sequence in said format; and transmitting the command sequence to the device as a plurality of pulses of light.

15. The method as set forth in claim 14 wherein each pulse of light is made by the steps of producing a plurality of adjacent, luminous traces followed by a plurality of adjacent, non-luminous traces.

16. The method as set forth in claim 14 and further including the step of:

producing two initial pulses to provide timing data followed by pulses representing command data.

17. The method as set forth in claim 16 wherein the two initial pulses are produced each video frame.

18. The method as set forth in claim 16 and further including the steps of:

using the timing data for receiving the command data by defining a window for each pulse of command data.

19. The method as set forth in claim 14 and further including the step of toggling the last bit in each video frame.

20. The method as set forth in claim 14 wherein said transmitting step is preceded by the step of waiting a predetermined time after the reception of command data before transmitting the command sequence.

21. The method as set forth in claim 20 and further including the steps of:

waiting a predetermined time after transmitting the command sequence; and transmitting an additional command sequence.

22. The method as set forth in claim 20 wherein the steps of claim 20 are repeated.

23. A method for optically transmitting data, said method comprising the steps of:

producing a series of vertically displaced, horizontal lines on a display, wherein the first two lines on the display provide timing information for receiving the data; and transmitting data as the presence or absence of a luminous line at a location corresponding to the timing information given by the first two lines.

24. The method as set forth in claim 23 wherein said producing step includes the step of:

generating each luminous line as a plurality of adjacent traces.

25. The method as set forth in claim 23 wherein said producing step includes the step of:

generating each luminous line as three adjacent traces.

26. The method as set forth in claim 23 wherein said transmitting step includes the step of:

toggling the last line of data in each video frame.

27. A method for optically transmitting data, said method comprising the steps of:

producing a series of vertically displaced, horizontal lines on a video display, wherein the first two lines on the video display provide timing information for receiving the data; and transmitting data as the width of a line at a location corresponding to the timing information given by the first two lines.

28. The method as set forth in claim 27 wherein said producing step includes the step of:

generating each line as a plurality of adjacent traces.

29. The method as set forth in claim 27 wherein said producing step includes the step of:

generating each line as a minimum of three adjacent traces.

30. The method as set forth in claim 27 wherein said transmitting step includes the step of:

toggling the last line of data in each video frame between a first width and a second width.

31. An optically programmable controller comprising:

a photodetector for converting pulses of light into electrical pulses;

a photoemitter for producing pulses of light;

a microcontroller interconnecting said photodetector and said photoemitter, said microcontroller being programmed to convert said electrical pulses into command data;

a memory coupled to said microcontroller for storing a set of primitives and said command data;

wherein said microcontroller executes a sub-set of said primitives in a sequence determined by said command data.

32. The optically programmable controller as set forth in claim 31 wherein said microcontroller executes a sub-set of said primitives in a sequence determined by said command data to cause said photoemitter to produce pulses of light in a format required by a controlled device.

* * * * *